US011025321B2

(12) United States Patent
Paramesh et al.

(10) Patent No.: US 11,025,321 B2
(45) Date of Patent: Jun. 1, 2021

(54) RECONFIGURABLE, BI-DIRECTIONAL, MULTI-BAND FRONT END FOR A HYBRID BEAMFORMING TRANSCEIVER

(71) Applicant: Carnegie Mellon University, Pittsburgh, PA (US)

(72) Inventors: Jeyanandh Paramesh, Pittsburgh, PA (US); Susnata Mondal, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 16/780,535

(22) Filed: Feb. 3, 2020

(65) Prior Publication Data

US 2020/0252115 A1 Aug. 6, 2020

Related U.S. Application Data

(63) Continuation-in-part of application No. 16/677,072, filed on Nov. 7, 2019.

(60) Provisional application No. 62/918,505, filed on Feb. 1, 2019.

(51) Int. Cl.
| | |
|---|---|
| *H04B 7/06* | (2006.01) |
| *H04B 7/0413* | (2017.01) |
| *H01Q 3/38* | (2006.01) |
| *H01Q 21/00* | (2006.01) |
| *H01Q 1/52* | (2006.01) |
| *H04B 1/40* | (2015.01) |

(52) U.S. Cl.
CPC .......... *H04B 7/0617* (2013.01); *H01Q 1/523* (2013.01); *H01Q 3/38* (2013.01); *H01Q 21/0025* (2013.01); *H04B 1/40* (2013.01); *H04B 7/0413* (2013.01)

(58) Field of Classification Search
CPC ...... H04B 7/0617; H04B 1/40; H04B 7/0413; H01Q 1/523; H01Q 3/38; H01Q 21/0025
See application file for complete search history.

(56) References Cited

U.S. PATENT DOCUMENTS

| | | | | |
|---|---|---|---|---|
| 2013/0102254 A1* | 4/2013 | Cyzs | ...................... | H04B 1/525 |
| | | | | 455/63.1 |
| 2016/0380745 A1* | 12/2016 | Wu | ......................... | H04B 1/40 |
| | | | | 370/277 |
| 2017/0041124 A1* | 2/2017 | Khandani | ................ | H04B 1/50 |
| 2019/0356375 A1* | 11/2019 | Friedman | ............. | H04B 7/0408 |
| 2019/0387504 A1* | 12/2019 | Jung | ..................... | G06F 17/142 |
| 2020/0106499 A1* | 4/2020 | Branlund | ................ | H04J 14/00 |

* cited by examiner

*Primary Examiner* — Freshteh N Aghdam
(74) *Attorney, Agent, or Firm* — Kacvinsky Daisak Bluni PLLC

(57) ABSTRACT

Designs and techniques to enhance power-efficiency and incorporate new features in millimeter-wave MIMO transceivers are described. A new mechanism for built-in dual-band, per-element self-interference cancellation (SIC) is introduced to enable multi-antenna frequency-division duplex (FDD) and full-duplex (FD) operation. Additionally, several innovative circuit concepts are introduced, including low-loss wideband antenna interface design, dual-band power combining PA, dual-band RF-SIC design, and bi-directional MIMO signal path design.

17 Claims, 13 Drawing Sheets

(A)

(B)

(C)

RECONFIGURABLE, BI-DIRECTIONAL, MULTI-BAND FRONT END FOR A HYBRID BEAMFORMING TRANSCEIVER

RELATED APPLICATIONS

This application claims the benefit of U.S. Provisional Patent Application No. 62/918,505, filed Feb. 1, 2019, and is a continuation-in-part of U.S. patent application Ser. No. 16/677,072, filed Nov. 7, 2019, both of which are incorporated herein in their entireties.

GOVERNMENT RIGHTS

This invention was made with U.S. government support under ECCS1343324 awarded by the National Science Foundation. The government has certain rights in the invention.

BACKGROUND OF THE INVENTION

Integrated phased-arrays in silicon technology have emerged recently for millimeter-wave 5G and Wi-Fi communication. Typical phased-arrays form a single steerable beam of electromagnetic radiation, thereby enabling highly directional communication supporting a single data-stream. Future wireless systems beyond 5G will likely use multiple-input-multiple-output (MIMO) techniques to transfer multiple streams of data simultaneously and thus can further improve data rate, device density and network capacity. In current phased-arrays, the signal processing required to form and steer beams is predominantly done using radio frequency (RF)-domain circuits. However, the signal processing required to support MIMO is complex and, as such, phased-arrays do not efficiently support MIMO. On the other hand, digital beamformers (DBF) can enable high-complexity signal processing required for MIMO, but their power consumption is prohibitive. Hybrid beamforming (HBF) transceivers break this deadlock by partitioning the requisite signal processing between the RF and digital domains. Currently, all groups in academia and industry focus on "partially-connected" HBF's. "Fully-connected" HBF's are known to be more efficient and offer superior performance, but they suffer from high implementation complexity.

Millimeter-wave communication based on beamforming and multi-input-multi-output (MIMO) techniques is expected to be a revolutionary new element in fifth-generation (5G) and beyond-5G wireless networks. Many RF beamforming systems (i.e., phased arrays) have been demonstrated for a single-band within which they support a single communication stream. Multi-element, multi-stream mm-wave MIMO over a single band are known in the art. The so-called fully-connected hybrid beamforming (FC-HBF) architecture was introduced and shown to achieve superior energy-efficiency than partially connected HBF (PC-HBF) beamforming receiver, where a conventional phased array is used for each stream.

FC-HBF architecture has been extended to a reconfigurable multi-band, MIMO/beamforming receiver, in which image-rejection heterodyne downconversion was used in conjunction with Cartesian-combining based beamforming to demonstrate multi-standard MIMO/beamforming in or both of two widely separated millimeter-wave bands the (for example, 27.5-28.35 and/or 37-40 GHz) for potential 5G or beyond-5G mm-wave deployment. In addition to supporting MIMO in each band, the dual-band FC-HBF receiver architecture also supports an efficient inter-band multi-antenna carrier aggregation (CA) mode where each aggregated carrier could access the full antenna aperture, and hence achieved full beamforming gain.

HBF receiver designs are known that are not of the FC kind. Moreover, in contrast to the aforementioned HBF approaches, multi-stream receiver designs that perform intermediate frequency (IF) beamforming in single or multiple bands are known. An adaptive beamforming technique that enables optimal minimum-mean-square-error (MMSE) beam/null steering within a hardware constrained RF/hybrid beamformer is also known.

SUMMARY OF THE INVENTION

The invention described herein comprises a circuit architecture for a bi-directional transmit/receive (T/R) module that can be used as a front-end interface between the radio electronics and an antenna array. It has the following salient features: (1) It can be used in many different types of beamformers, including partially-connected HBF's, fully-connected HBFs and DBF's; (2) The circuit can be designed to have a single contiguous frequency response or a dual-band frequency response covering disparate frequency bands (e.g., 28/37 GHz). The dual-band embodiment can support carrier aggregation (CA) where the circuit can transmit or receive two signals concurrently in two bands of operation, thereby offering a mechanism to increase throughput; (3) Both single-band and dual-band embodiments can be reconfigured for many different types of system scenarios including time-division duplex MIMO, frequency-division duplex MIMO and multi-antenna CA; (4) The circuit features a built-in mechanism to perform interference cancellation of narrowband interference in the front-end of the receive path of a beamforming transceiver. Different forms of interference can be suppressed using this mechanism, including "self-interference cancellation (SIC)"; (5) The SIC mechanism extends the applicability of the proposed circuit to "simultaneous transmit-receive operation (STAR)" operation. Two forms of STAR can be supported. A STAR-Frequency Duplexed (STAR-FDD) mode, where the transmitter and receiver tuned to different frequency bands, and a STAR-Full Duplex mode (STAR-FUD) mode, where the transmitter and receiver tuned to the same frequency channel in the same band; and (6) In both STAR-FDD and STAR-FUD modes, signal leakage from the transmitter can corrupt the signals passing through the receiver and destroy the fidelity of the received signal. This SIC inherently offers a mechanism to cancel such self-interference that protects the receive signal from being corrupted.

Disclosed herein is a 28/39 GHz front-end applicable to beyond-5G wireless networks. The invention exhibits three key features. First, a fully-connected (FC) transmitter architecture is introduced for hybrid beamforming (HBF). It is shown that the power efficiency of FC-HBF is superior to the conventional partially-connected (PC) HBF for a given modulation and antenna geometry. Second, a compact/low-cost circuit concept is introduced that supports bi-directional T/R operation concurrently at 28 and 37/39 GHz, thereby facilitating multi-antenna carrier-aggregation (CA) or MIMO time division duplexing (TDD) with high antenna count. Third, a built-in mechanism for dual-band, per antenna, self-interference cancellation (SIC) is introduced, thanks to the FC-HBF architecture. The front-end is applicable to FDD or full-duplex (FD) multi-antenna systems; such SIC is not available in PC-HBF's. Also, the front-end is directly applicable to dual-band digital beamformers (DBF).

Also disclosed herein are two innovative system concepts for beyond-5G multi-antenna systems. First, the increase in peak-to-average power ratio (PAPR) in a FC-HBF (see View (B) of FIG. 1) transmitter compared to PC-HBF see View (A) of FIG. 1) is identified for the first time. It is shown that digital beamformers (DBF) have the same PAPR considerations as FC-HBF for an equivalent number of streams. To achieve identical spectral efficiency, FC-HBF consumes significantly lower power than PC-HBF when any power amplifier topology that has a better back-off efficiency characteristic than Class-A is used.

Second, a new architecture which is conceived to directly enable for simultaneous transmit and receive (STAR) beamforming for multi-antenna frequency-division-duplexing (FDD) or full-duplex (FD) communication is introduced. The proposed FC-HBF structure can be reconfigured to enable self-interference cancellation (SIC) on a per-element basis without any hardware overhead. Such SIC is not possible in a PC-HBF.

A compact circuit implementation is also introduced herein. The circuit architecture can support bidirectional transmit or receive operation at 28 GHz, 37/39 GHz, or concurrently in both bands. Reconfiguration across multiple bands helps avoid the use of a dedicated beamforming module for each band, thereby reducing overall system complexity, area, and cost.

Three main configuration modes and ten sub-modes are available. Mode I (see View (A) of FIG. 2) and Mode II (see View (B) of FIG. 2) are time division-duplexed (TDD) FC-HBF transmit and receive modes, respectively, and can be configured for multi-stream MIMO operation in each band (in sub-modes A and B) or inter-band CA (in sub mode C). Mode III (see View (C) of FIG. 2) enables FDD/FD, where half of the array is configured as TX and another half as RX with built-in SIC.

A bidirectional two-stream front-end prototype has been designed. Passive structures are extensively reused in the TX and RX modes to reduce die area.

This invention can serve as the front-end circuit supporting a single antenna and one or more streams. In a MIMO transceiver, it can be replicated for each antenna in an antenna array. The front-end features several new circuit techniques including: (1) a multi-band, low-loss LNA-PA-antenna interface network, (2) power-combining Class-B PA with dual-band second harmonic shorting network, (3) self-neutralized bidirectional programmable-gain amplifier (PGA), (4) reconfigurable combiner/splitter to support incorporation into FC-HBF transceivers, and (5) dual-band RF self-interference (SI) canceller.

DETAILED DESCRIPTION

Described herein is a 28/39 GHz front-end applicable to beyond-5G wireless networks. Note that, while the invention is being explained in terms of an implementation using 28/39 GHz, it should be realized by one of skill in the art that the scope of the invention is intended to include any two mm-wave bands.

The front-end described herein features three novel aspects. First, a fully-connected (FC) transmitter architecture is introduced for hybrid beamforming (HBF). The power efficiency of FC-HBF is superior to the conventional partially-connected (PC) HBF for a given modulation and antenna geometry. Second, a compact/low-cost circuit concept is introduced that supports bi-directional T/R operation concurrently at two mm-wave bands, thereby facilitating multi-antenna carrier-aggregation (CA) or MIMO TDD with high antenna count. Third, a built-in mechanism for dual-band, per antenna, self-interference cancellation (SIC) is introduced, made possible by the FC-HBF architecture. The front-end is applicable to FDD or full-duplex (FD) multi-antenna systems. The described SIC is not available in PC-HBF's. Also, the front-end is directly applicable to dual-band digital beamformers (DBF).

Figure 1:
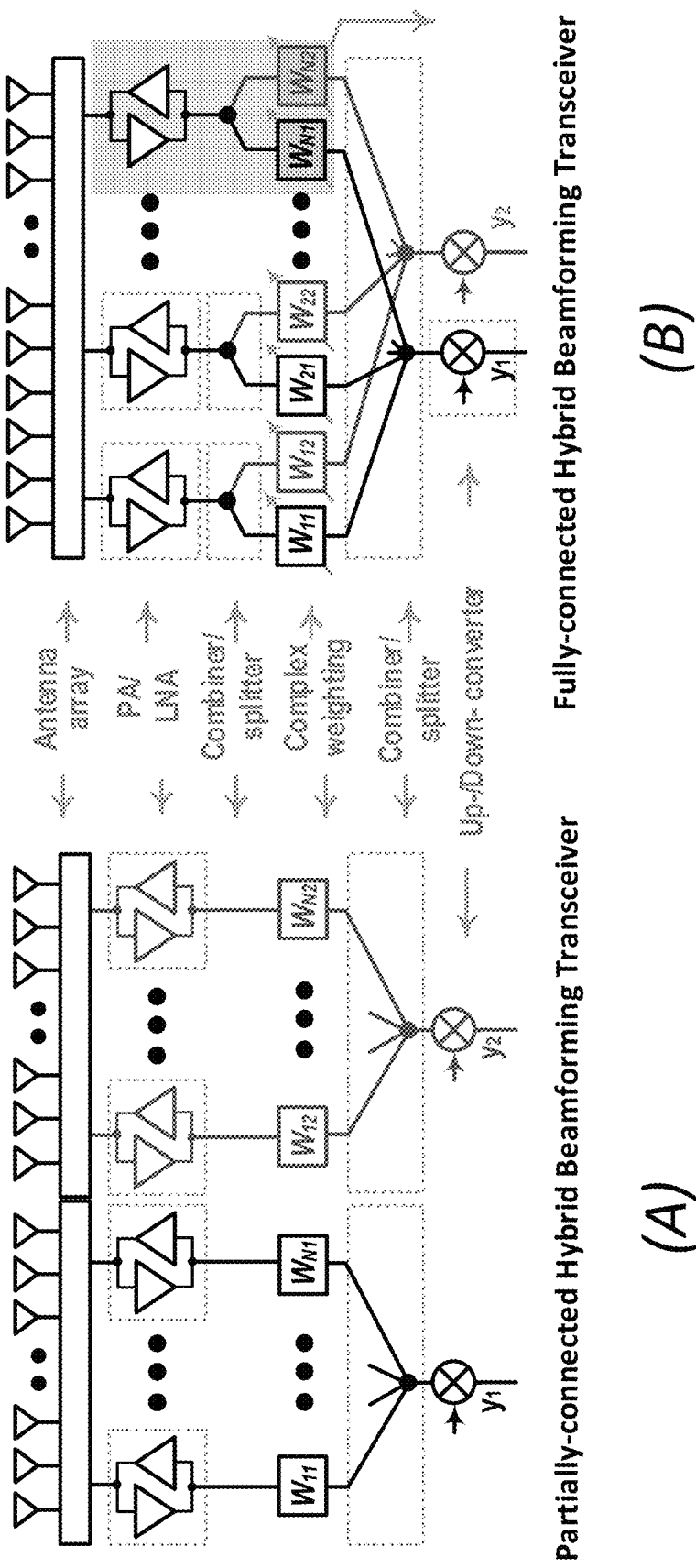
FIG. 1 shows partially and fully connected hybrid beamforming transceivers.

Compared to a PC-HBF, the FC-HBF has superior energy and spectral efficiencies for a given antenna array geometry. View (B) of FIG. 1 shows the proposed bi-directional FC T/R architecture and, in Views (A-C) of FIG. 2, how it can be reconfigured between 3 modes and 10 sub-modes.

Figure 2:
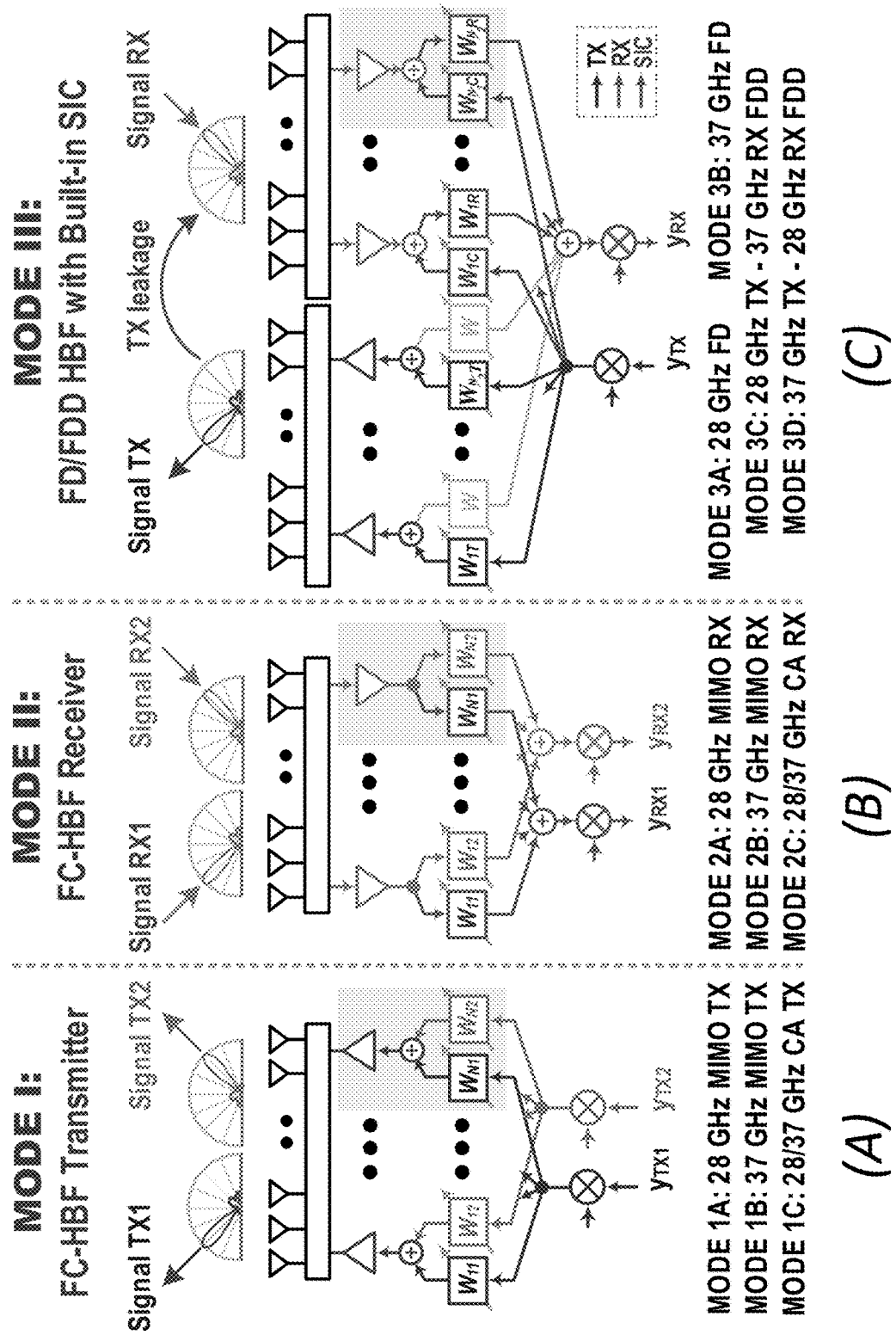
FIG. 2 shows three modes of operation for the fully connected hybrid beamforming transceiver showing fully connected transmit, fully connected receive and full-duplex (with SIC) modes.

Modes I and II shown in Views (A-B) of FIG. 2 are FC-TX and FC-RX TDD modes, respectively, and can be used for MIMO (in each band) or CA. Mode III, shown in Views (C) of FIG. 2, applies to FDD/FDD, where a complete MIMO transceiver (also see FIG. 7) that comprises several of the proposed front-ends is partitioned into transmit (TX) and receive (RX) parts. In the TX part, the complex-weights in one of the streams are left unused. In the RX part, one of the complex-weights is configured for reception, while the other complex-weight (which is available in the FC architecture) is used to inject an independently weighted SIC signal for that element. Thus, SIC can relax the dynamic range requirement of the following RX circuits. This SIC technique provides an elegant way to generate an independently weighted RF domain SIC signal from a single upconverted TX signal for each antenna in an FDD or FD beamformer.

Figure 3:
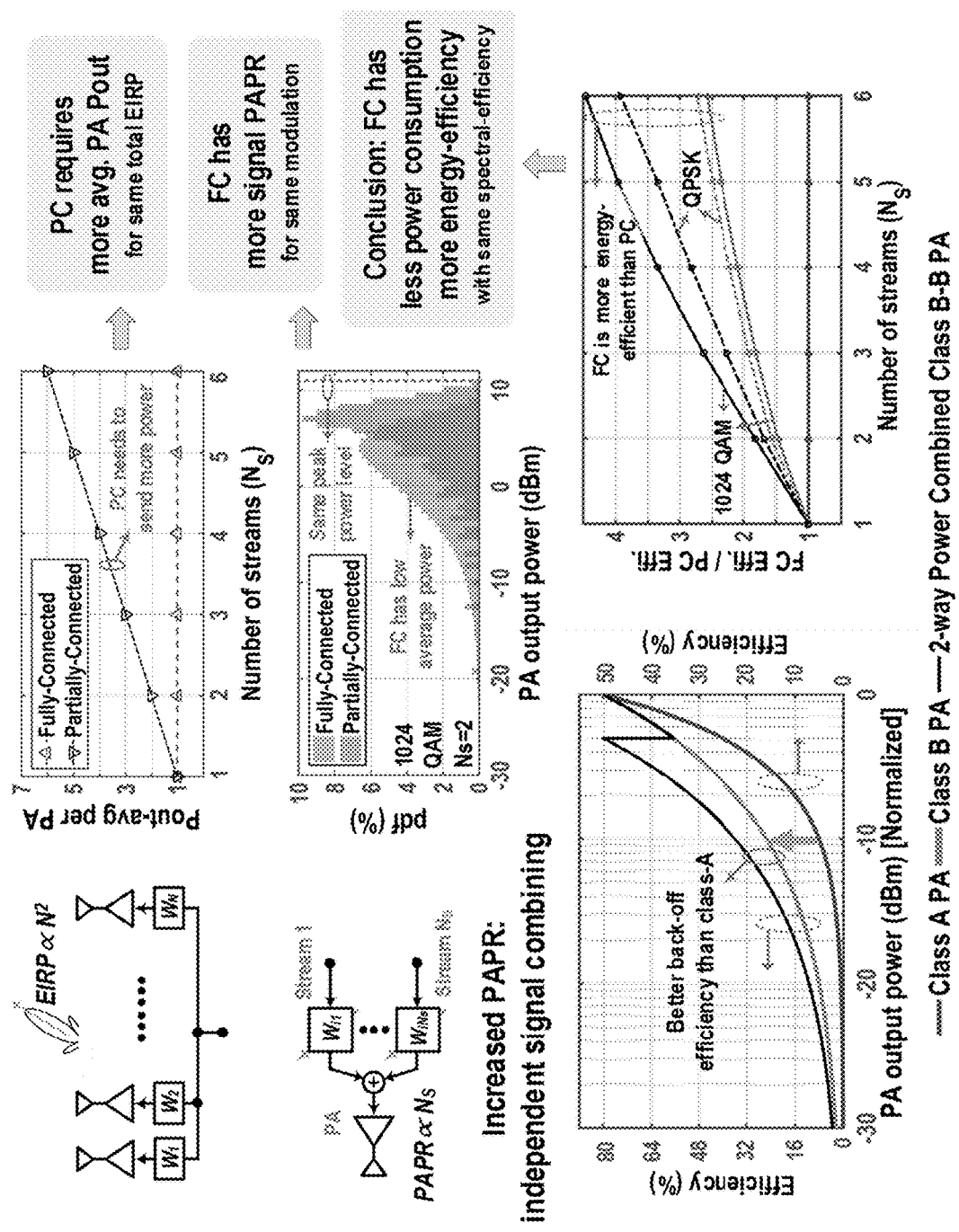
FIG. 3 shows various characteristics of a partially-connected versus a fully-connected HBF TX.

The pros and cons of FC-TX versus PC-TX are described next and are displayed graphically in FIG. 3. In a multiantenna system, the EIRP scales quadratically with the number of antennas. Because each stream ($N_S$=# of streams) accesses all N antennas in FC-TX and $N/N_S$ antennas in PC-TX, FC-TX offers superior spatial combining. Consequently, each PA in FC-TX requires $N_S$ times lower average output power to emit the same EIRP per stream as PC-TX. However, in an FC-TX, because independent signals from different streams are combined before the PA, the PAPR requirement of each PA is higher than the modulation-dependent PAPR of each stream. It can be shown that the effective PAPR that must be handled by each PA is $N_S$ times higher in FC-TX than in PC-TX. Therefore, the peak power specification of each PA in PCTX and FC-TX are equal. Based on these considerations, it is evident that for any PA that has lower DC consumption at back-off than at peak output power (i.e., non-Class-A), the total power consumption of FCTX is lower than PC-TX. Also, the margin of superiority of power efficiency of FC-TX depends on the PA's back-off efficiency and improves with $N_S$. As shown in FIG. 3, with ideal Class-8 PA's, FC-TX has 0.64×/0.6× the power consumption of PC-TX for QPSK/1024-QAM for two streams while achieving identical spectral efficiency.

Figure 4:
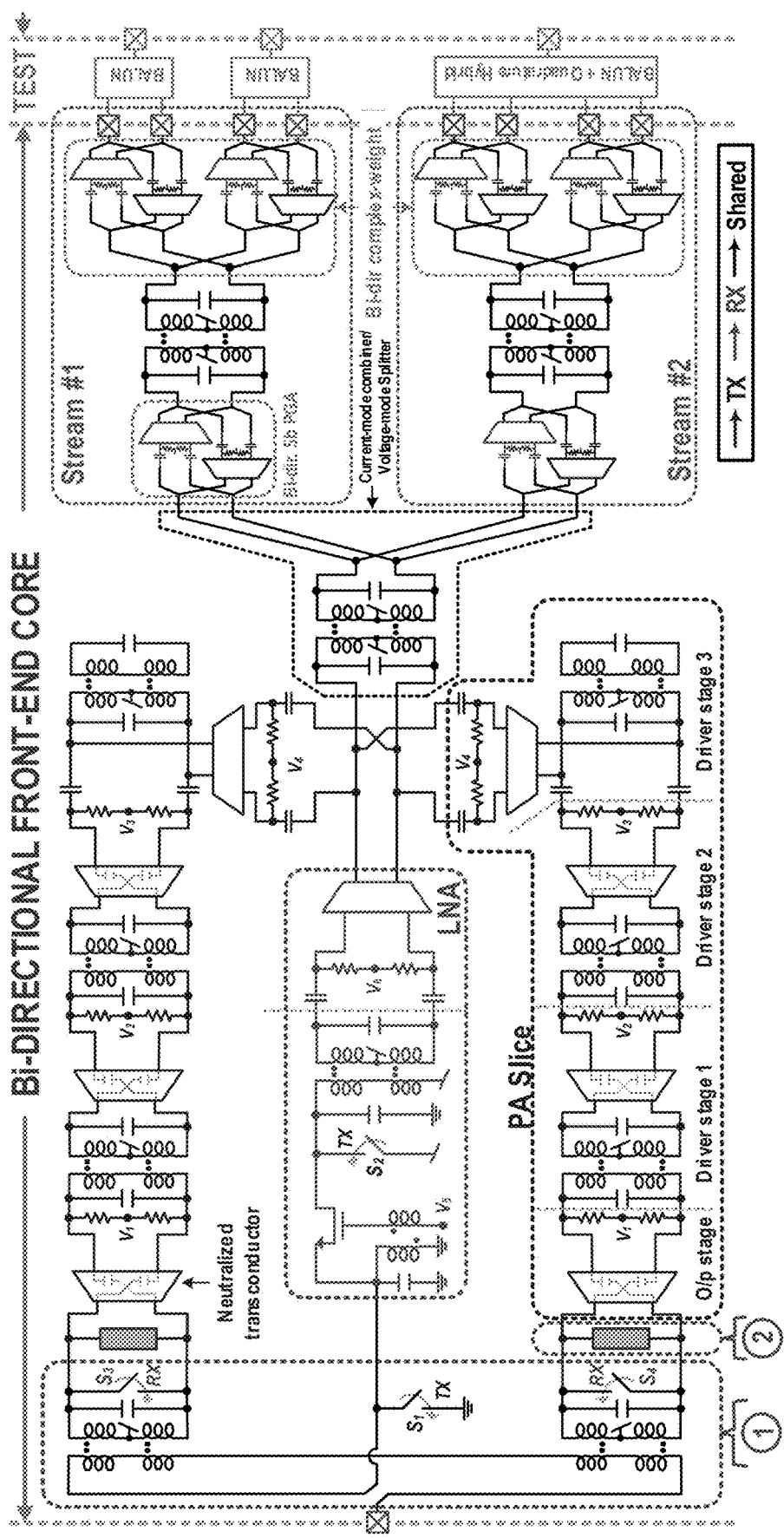
FIG. 4 shows a 28/37 GHz bidirectional-transmit-receive fully-connected channel.

FIG. 4 shows a bi-directional, dual-band FC-HBF comprising several constituent circuit blocks designed for dual-band operation: a TX path PA (blue), an RX path LNA (red), a shared antenna interface network (AIN), a splitter-combiner structure, independent bi-directional complex-weight circuits for each MIMO stream and auxiliary on-chip test circuits. It should be noted that the same structure can be designed to operate in a single contiguous band.

Figure 5:
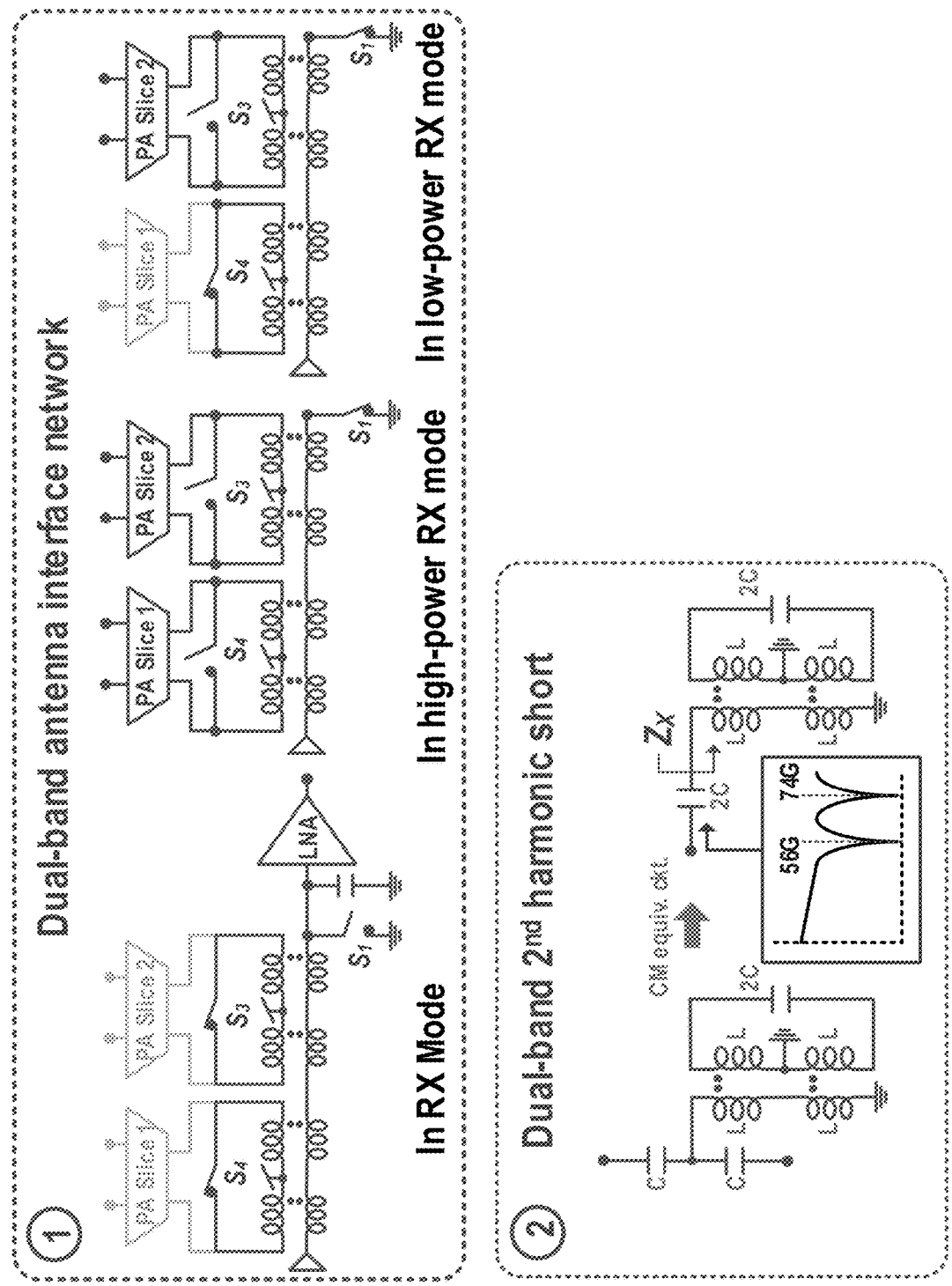
FIG. 5 shows a dual-band antenna interface switch in view (1) and a second harmonic short design in view (2).
Figure 6:
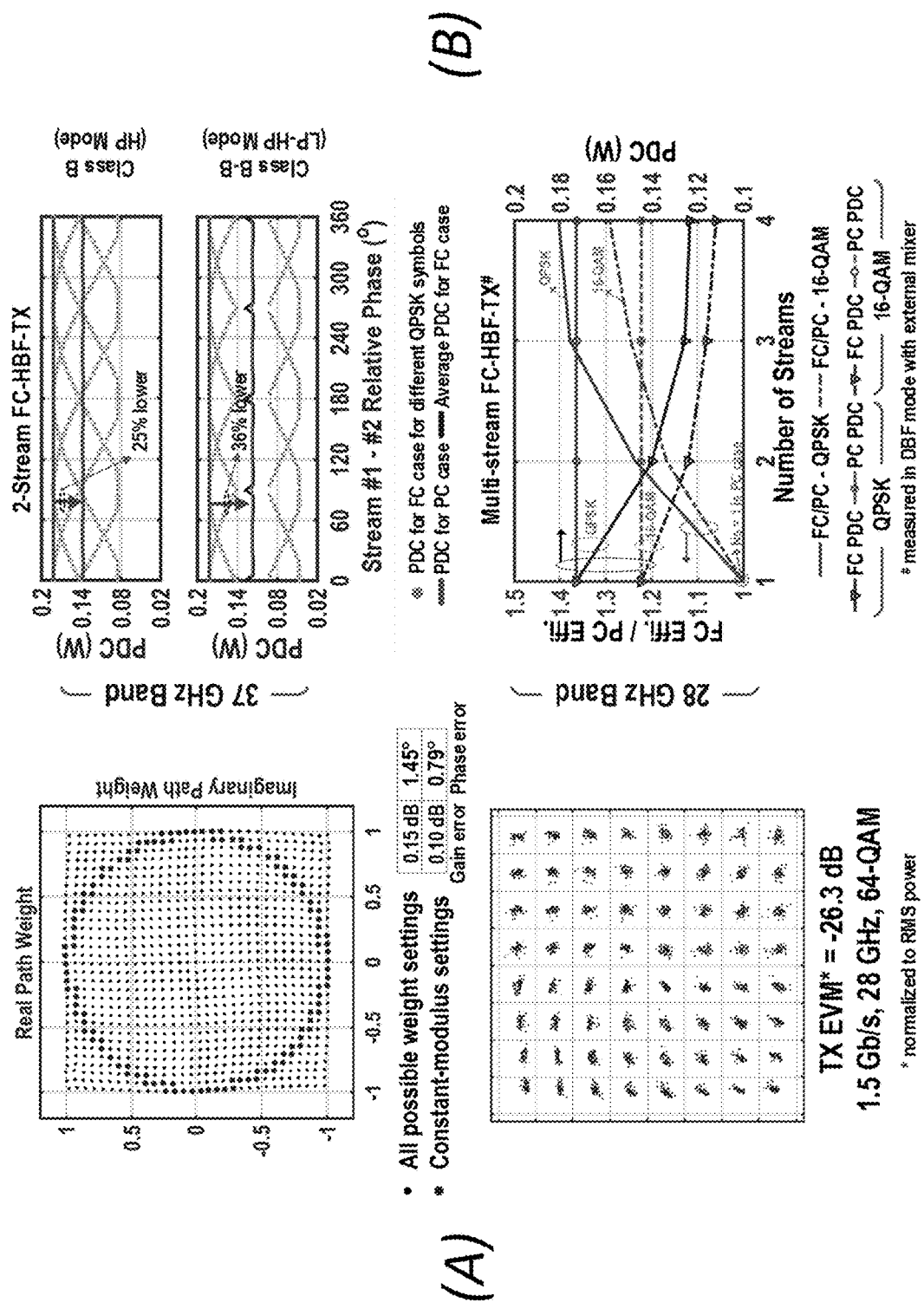
FIG. 6 shows a transmitter path complex-weight and EVM in view (A) and FC versus PC DC power consumption ($P_{DC}$) in two stream FC/HBF and multistream FC-HBF/DBF in view (B).

The AIN, shown as (1) in FIG. 5, acts as a two-way transformer power-combiner in TX mode and as a matching network to a CG LNA in RX mode. Switches S1-S2 and switches S3-S4 can be turned on or off to activate a high-power (HP) TX mode, a low-power (LP) TX mode or the RX mode. Switches S1, S2, S3 and S4 may, in some embodiments, be implemented as thin-gate or thick-gate MOS switches.

Each PA slice comprises three driver stages followed by an output stage which drives the primary of the power-combiner. In preferred embodiments, a Class B output stage may be used, while in other embodiments, an output stage of any class may be used.

The Class-B stages employ a dual-band $2^{nd}$ harmonic shorting network, shown as (2) in FIG. 5, to improve efficiency and $P_{SAT}$. In this network, the impedance $Z_X$ is equivalent to an inductor having different values at the 2nd harmonic of the two frequency bands (56, 74 GHz). Thus, the CM input impedance is equivalent to a series LC resonant network that concurrently acts as a short at the two frequencies.

The signal path is designed so that additional T/R switches are not required over those used in the AIN. This includes the interface between the LNA-PA and the combiner-splitter, and also the bi-directional gain stages in the PGA and the complex-weights, designed as back-to-back transconductors, which are powered on or off to activate the TX or RX modes.

The auxiliary circuits shown in FIG. 4 were included for testing purposes in the present embodiment, but similar circuits can be used to expand this front-end to a complete beamformer.

Circuit design choices have been made to achieve maximal compactness, thereby reducing chip area and hence the cost of the MIMO transceiver. Moreover, designing for compactness is advantageous since it reduces interconnect lengths when such front-ends are combined into a larger MIMO transceiver. In particular, in one embodiment, passive structures were: (1) shared between TX and RX; and (2) custom designed to minimize slice height.

Simultaneous Transmit and Receive (STAR) Beamforming

STAR operation in separate transmit/receive frequency bands is equivalent to frequency division duplex (FDD), while STAR operation in the same frequency band is also called full-duplex (FD), and results in doubling in throughput (a theoretical maximum) compared to a time division duplexed (TDD) system. In both FDD and FD, the key challenge in STAR communication is the self-interference (SI) due to leakage of the strong transmit signal into the path of the weak received signal, causing severe corruption through interference and nonlinearity. In the case of FDD, the leakage can be partially attenuated by filtering in the front-end diplexer. However, this mechanism is not available in the FD case, and therefore, signal cancellation of the transmit signal leakage is the only viable option.

Figure 8:
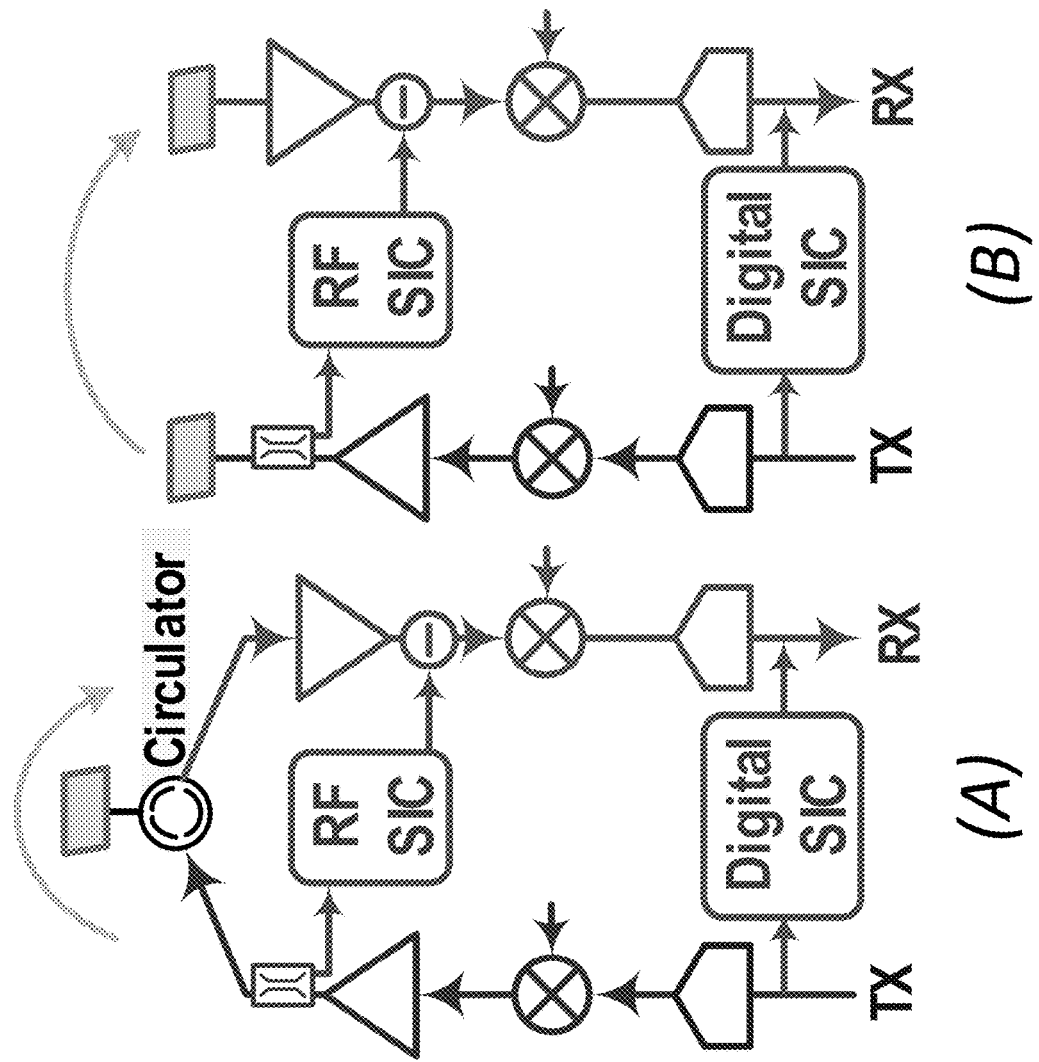
FIG. 8, view (A) is a schematic diagram of a shared-antenna STAR system. View (B) is a schematic diagram of a separate-antenna STAR system.

There are two variants of STAR systems: shared-antenna STAR, shown in View (A) of FIG. 8, where each antenna element is shared between transmit and receive paths, and separate-antenna STAR, shown in View (B) of FIG. 8, where transmit and receive paths use completely separate antennas. While the shared-antenna approach has gained interest in sub-6 GHz STAR communication, the separate-antenna approach is advantageous at mm-wave multi-antenna beamforming system for the following reasons: (1) The separate-antenna approach avoids the use of a circulator. On-chip implementations of circulators are possible, but they are lossy, have limited linearity and bandwidth, and achieve inadequate transmit-receive isolation. Furthermore, they occupy large die area and are difficult to integrate into multi-antenna transceivers with large numbers of elements in a cost-effective manner; (2) More importantly, due to small element spacing at mm-wave, adjacent elements experience significant coupling. Hence, inter-element self-interference (SI) between nearby elements would be severe in the shared-antenna approach. In a circulator-based STAR beamforming system, although the circulator in each element isolates the receiver from SI from its own transmit signal, SI from adjacent elements pass through the circulator with little attenuation. However, in a separate-antenna approach, SI due to antenna coupling can be greatly reduced by increasing the physical spacing between the transmit and receive antenna arrays.

Figure 9:
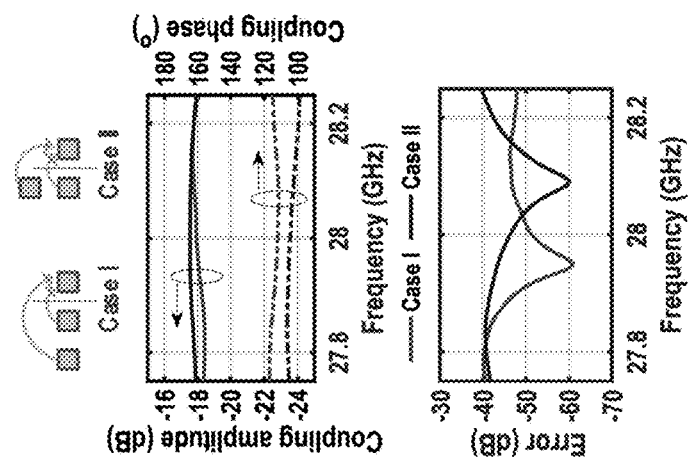
FIG. 9, view (A) is a schematic diagram of a multi-antenna STAR system with DBF and analog domain SIC. View (B) is a schematic of a multi-antenna STAR system with HBF featuring per-element SIC. View (C) shows antenna coupling amplitude and phase variation resulting single tap estimation air across frequency for two different antenna coupling scenarios.
Figure 9:
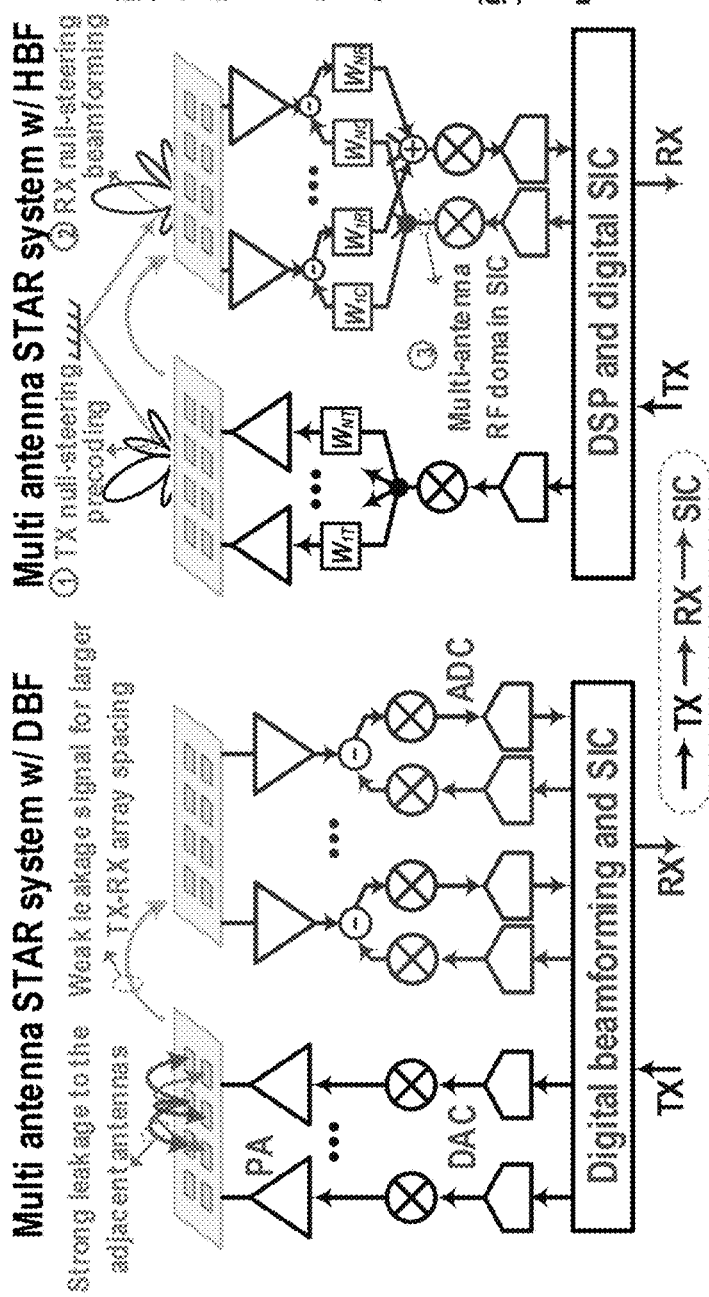

A single separate-antenna STAR transceiver, shown in View (B) of FIG. 8, can be extended to a multi-antenna transceiver as shown in View (A) of FIG. 9. The transmit path has a DAC, upconverter and PA in each element along with digital precoding, while the receive path has LNA, downconverter and ADC in each element along with digital beamforming. However, the conventional method of performing RF SIC by feeding a weighted PA signal to the canceller path is impractical in a multi-antenna system because feedback from each TX antenna to every RX antenna would be required. Therefore, as shown in View (A) of FIG. 7, an RF domain cancellation signal must be generated separately for each element in the RX array by using an upconverter and DAC per element to perform per element SIC. The back end digital processing can further reduce the SI by optimizing the TX leakage in the TX array and by cancelling the residue SI in the digital domain in the RX array.

View (B) of FIG. 9, shows how the aforementioned SIC approach can be implemented in the proposed bi-directional FC-HBF (see View (C) of FIG. 2). Here, a reduced number of bidirectional frequency translation chains (i.e., streams) interface to a large number of antennas through per-element bi-directional RF-domain complex weights. Two separate FC-HBF transceivers are used in the FD transceiver, one each for TX and RX. In the TX FC-HBF, one stream is configured for transmit. In the RX part, one stream is configured for receive, while the other stream is repurposed to upconvert a copy of the baseband transmit signal. The upconverted transmit signal copy can be independently complex weighted in each element to cancel the incoming transmit signal leakage, thereby performing a per-element SIC. Thanks to its built-in SIC mechanism, the FC-HBF transceiver offers an efficient basis for STAR beamforming without the need for additional cancellation circuitry. It is important to note that a similar SIC mechanism is not available in the PC-HBF.

The SI in a multi-antenna STAR system can occur in two ways: (1) SI through antenna coupling from the transmit to the receive antennas; and (2) SI due to a nearby reflection of the transmitted signal that leaks into the receiver through the receive antenna array. The first kind of SI has small group delay, where the second kind may have small or large group delay depending on the distance of the reflector. The SI with lower group delay is expected to have higher strength due to having lower path loss. While the DBF-based STAR system in View (A) of FIG. 9 can cancel SI with both small and large group delays, the FC-HBF-based STAR system shown in View (B) of FIG. 9 can only cancel SI with small group delay as only a single tap-independent cancellation can be performed in each element.

View (C) of FIG. 9 shows the measured coupling between patch elements (same polarization) for two different multi-antenna configurations. Over a 500 MHz signal bandwidth, the coupling is seen to have fairly flat amplitude and phase responses, which can be estimated by a single tap (i.e., $\alpha e^{j\theta}$) with better than −40 dB of estimation error. However, in the FC-HBF, large group-delay SI can be canceled by directing a spatial-null towards the reflection paths in both the transmit and receive beamformer (at the cost of some degradation of the main beam gain in case of low element count arrays). Such SIC, based on null-steering in the RX array cancels the SI only after beamforming; on the other hand, the single-tap RF SIC cancels the SI right at LNA output. Note that, nulls in both the transmit and receive array patterns can be steered towards different leakage multipath components or can be steered towards the same path to achieve higher rejection.

Figure 7:
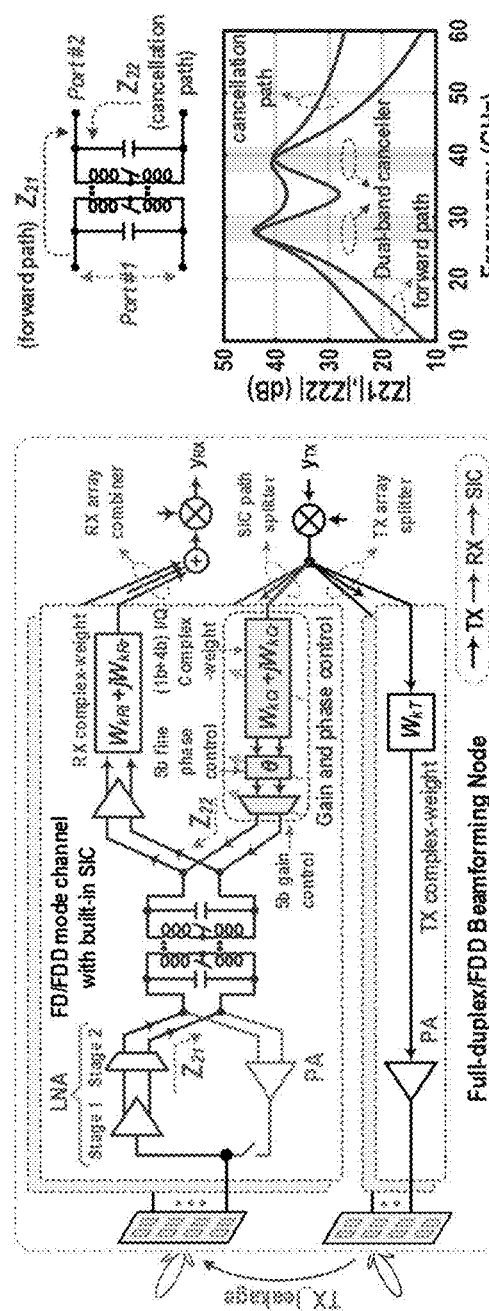
FIG. 7 shows FDD/FD mode dual-band per-element built-in SIC in FC-HBF TRX in view (A) and SIC versus phase and power of self-interferer, FDD and FD mode cancellation in view (B).
Figure 7:
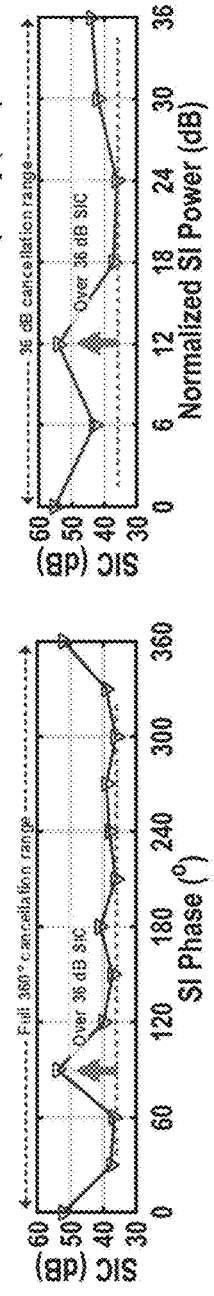
Figure 7:
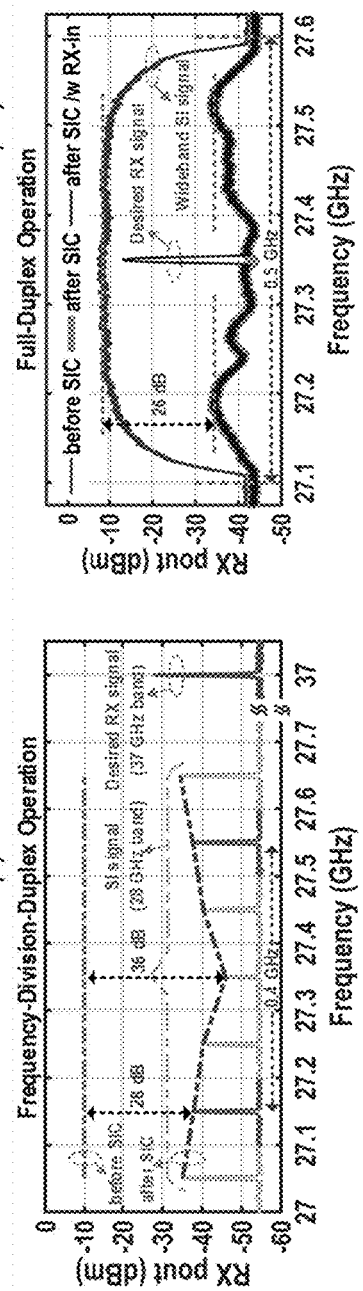

FIG. 7, view (A) shows a conceptual FDD/FD beamforming node including TX (blue), RX (red) and per-antenna SIC (green). The RX signal passes through $Z_{21}$ of the coupled-resonator. The SIC signal current is injected into the $Z_{22}$ port of the coupled-resonator using a complex-weight cell (5b 1/Q) followed by fine gain control PGA (5b, no sign) and fine phase control (<1°). $Z_{21}$ and $Z_{22}$ are designed to have similar frequency responses at the resonant frequencies (placed at the bands of interest) to enable dual-band SIC. To characterize SIC performance, the concept of FIG. 7 was simulated using external equipment to generate the RX signal, the SI and a reference version of the SI leakage. SIC greater than 36 dB was measured over 360° SI signal phase variation and over 36 dB range of SI power, as shown in FIG. 7, View (B).

Next, FDD operation is characterized using a desired 37 GHz RX tone and a two-tone interferer near 28 GHz. SIC weight settings were set once for maximum cancellation at band center. The two-tone spacing was swept to characterize SIC over BW. FIG. 7 shows that 28d8 SIC was achieved for 0.4 GHz RF BW. FD mode operation is then demonstrated at 28 GHz using a desired RX tone and a modulated SI; 26 dB SIC is achieved over 500 MHz RF BW of the interferer.

28/39 GHZ FC-HBF Circuit Design

A reconfigurable bidirectional multi-band (28/39 GHz) FC-HBF transceiver front-end has been designed in a 65-nm CMOS process. A detailed schematic of the front-end is shown in FIG. 4 along with on-chip test circuitry. The prototype constitutes a TX path (highlighted in blue in FIG. 4) dual-band two-way power combining power amplifier (PA) and an RX path (highlighted in red in FIG. 4) low-noise amplifier (LNA) that interfaces the antenna port using a shared (shared blocks are shown in black in FIG. 4) multi-band antenna interface network (AIN). Opposite to the antenna port, LNA and PA are interfaced with two bidirectional T/R streams, where each stream consists of a complex weight, a fine gain control, and a fine phase control. All large area passive structures in the TX and RX paths, except those inside LNA and the PA are reused for compactness.

Moreover, all the signal path reconfigurations are done without using any switch in the signal path. Two sets of bi-directional PGAs are available for two-stream complex weighting in hybrid MIMO/beamforming. The bi-directional front-end can be used as the core building block of a multi-mode two-stream FC-HBF transceiver of the type shown in FIG. 1 and FIG. 2. This can be done in one of two ways: (1) by having one quadrature hybrid per element per stream after the PGA's, followed by one parallel combiner for each stream; or (2) using a dual-band Cartesian combining approach. Also, it should be noted that, by excluding the complex weights, the front-end can be used directly in a DBF (View (A) of FIG. 9).

In the prototype, different off-chip interfaces are used for the weights in each stream; this is done solely for test purposes. In stream #1, the I- and Q-PGA's are connected via baluns to separate pads for standalone testing. In stream #2, a quadrature hybrid is incorporated to implement full complex weighting.

Multi-Band Antenna Interface Network (AIN)

In this section, the design of a compact, multi-band antenna interface network is discussed. Consider a common single-band solution where the antenna interface switch is implemented using a series quarter wavelength (λ/4) transmission line and a shunt switch. Even at mm-wave frequencies, on-chip λ/4 transmission lines have large footprint and high insertion loss, thereby degrading TX path output power ($P_{out}$) and RX path noise figure (NF). Partial solutions to this problem are proposed in single-band (28 GHz) phased arrays, where the TX path λ/4 line is eliminated, thereby avoiding the output power penalty. However, several shortcomings remain. A λ/4 line is still required in the RX path and has large footprint and high loss. High inductance in the RX path affects the LNA input matching bandwidth. In the RX mode of both designs, the RX input experiences an LC-tuned OFF-state TX load that presents high impedance at the antenna port only over a narrow bandwidth. This adversely affects the RX input match bandwidth. More importantly, in TX mode, the OFF-state RX-side switch in View (a) of FIG. 9 loads the TX via the λ/4 line, causing reduced TX bandwidth and output power. This loss can be estimated as follows. For a transmission line with characteristic impedance $Z_0$ and quarter wavelength at frequency $f_C$ terminated in a switch with resistance RON, the input impedance can be written as:

$$Z_{off}(f) = Z_0 \frac{R_{ON} + jZ_0 \tan\left(\frac{\pi}{2} \times \frac{f}{f_C}\right)}{Z_0 + jR_{ON} \tan\left(\frac{\pi}{2} \times \frac{f}{f_C}\right)} \xrightarrow{R_{ON} \to 0} jZ_0\left(\frac{\pi}{2} \times \frac{f}{f_C}\right)$$

It is seen that the impedance looking into the RX is high at $f_C$, but has low reactive values as the operating frequency deviates from $f_C$. If a PA is designed for the optimal output impedance of the antenna $Z_0$ at $f_C$, it can be shown that the PA's maximum output power at a frequency f in the presence of OFF-state RX side impedance is given by:

$$\frac{P_{out}(f)}{P_{out}(f_C)} = \left(1 - \frac{Z_0^2}{Z_{OFF}^2(f)}\right)^{1/2} = \left(1 - \cot^2\left(\frac{\pi}{2} \times \frac{f}{f_C}\right)\right)^{1/2}$$

Thus, if a single-band design is used in the dual-band design at hand, the OFF-state RX-side impedance can cause as high as ~3 dB of loss at f=37 GHz for $f_C$=28 GHz. Simulation conducted with the designed power combining PA shows similar output power degradation when a similar OFF-state switch is connected to the output of the PA.

View (1) of FIG. 5 show the various configuration modes of the proposed multi-band AIN, where an LNA and a two-way power combining PA are interfaced to an antenna port using a single passive network and three MOS switches $S_1$, TX Mode: In the TX mode, LNA input switch $S_1$ is in the ON-state. The AIN itself serves as the two-way power combining network. In the high power (HP) TX mode switches $S_3$, and $S_4$ are both left open and both PA slices turned ON. In the low power (LP) TX mode, only $S_3$ is open with one PA slice ON. This AIN design overcomes the bandwidth limitations of conventional front-end switches. It can be shown that the non-zero $R_{ON}$ of the switch $S_1$ results in a loss of 20 log (1+$R_{ON}$/50) dB, which is only ~0.3 dB for $R_{ON}$=2Ω. Similar loss is estimated in simulation. Note that, although the LNA is turned OFF in the TX mode by turning OFF all the LNA biases, a non-negligible feedback signal still flows through the LNA from the PA's output to its input (see FIG. 4), which degrades PA stability. To further reduce the feedback signal strength, the switch $S_2$ is turned ON (see FIG. 3a), which significantly reduces the gain of the first LNA stage.

RX Mode: In the RX mode, LNA input switch $S_1$ is turned OFF, $S_3$ and $S_4$ are both turned ON, and both the PA slices OFF. Therefore, the RX path consists of a p-matching network with series inductance from AIN, the LNA input capacitance and the antenna port capacitance. It can be shown that maximum series inductance $L_{AIN}$ that can be used to match an LNA input impedance $R_{i,LNA}$ to antenna port input impedance of $R_{i,ANT}$ at frequency f is the following:

$$\max(L_{AIN}) = L_m = \sqrt{R_{i,LNA} R_{i,ANT}}/(2\pi f)$$

In the proposed design, turning ON switches $S_3$ and $S_4$ is especially advantageous. This is because, in RX configuration, they help reduce the series inductance by a factor of (1−$k^2$) compared to when both switches are OFF. Therefore, by turning ON $S_3$ and $S_4$, the series inductance is reduced below $L_m$ which makes the input matching feasible. A $g_m$-boosted common-gate input stage is used in the LNA. $R_{i,LNA}$ is designed to be lower than 50Ω to reduce the input transistor's noise contribution. In simulation, the it-matching network degrades the LNA NF only by 0.8/1 dB in 28/37 GHz bands.

Two-Way Power Combining Power Amplifier (PA)

PA Core: RF and mm-wave PAs in low-voltage CMOS technology achieve high output power by coherently combining the outputs of multiple PA units. In such power combining PA's, a subset of PA units can be turned OFF to improve back-off efficiency at lower input power. Herein, two-way power combining is implemented using a transformer-based power combining network. As explained above, the PA can be configured into HP or LP modes. By using the LP configuration at lower input power, PA back-off efficiency can be significantly improved, which in turn enhances the superiority of FC-HBF or DBF architectures.

The output stage of each PA unit is biased in deep class-AB (around class-B) to improve peak-efficiency as well as back-off efficiency over class-A PA. Moreover, as the third harmonic current from the output stage transistors can be substantially reduced by biasing them in class-B, the output 1-dB compression point can also be pushed closer to the peak output power, thereby achieving flatter amplitude-to-amplitude (AM-AM) characteristics. Additionally, the sweet spot biasing around class-B also reduces amplitude-to-phase (AM-PM) distortion even without the varactor-based gate capacitance nonlinearity compensation. However, class-B output stage suffers from low gain. Therefore, three driver stages with class-AB biasing are used in each PA unit to ensure high overall PA gain. The transconductors in the output stage and driver stages #1 and #2 (see FIG. 4) use pseudo-differential NMOS pairs with cross-coupled $C_{GD}$ neutralization for improved linearity at a scaled power supply. The driver stage #3 in FIG. 4) employs pseudo differential pair with cascode for better output to input isolation. All inter-stage matching networks use dual-band coupled-resonator loads, whose design is explained below. Common-mode stability of the PA is greatly improved by leaving the secondary side center tap of the transformers open (see FIG. 4). This restricts the common-mode feedback current to flow to the previous stage by providing a very high common mode impedance.

Dual-Band Loads and Gain Equalization: The transimpedance ($Z_{21}$) of a transformer coupled-resonator can be used to realize wideband load and to realize a dual-band load. $Z_{21}$-based dual-band loads are extensively used in this design in the PA as well as in other parts of the front-end. In addition to $Z_{21}$, the driving point impedance ($Z_{11}$) of a transformer coupled-resonator also has a dual-band characteristic that is used in the driver stage #3 (see FIG. 4) of the PA. The equation below reveals that both the $Z_{11}$ and $Z_{21}$ of a symmetrically coupled-resonator ($L_1=L_2=L$ and $C_1=C_2=C$ in View (a) of FIG. 10) have identical complex pole pairs, and therefore can both be used as concurrent dual-band loads where the center frequencies of the two bands coincide with the two pole frequencies this equation:

$$Z_{11}(S) = \frac{\omega_0^2 L \left(S + \frac{\omega_0}{Q}\right)\left(S^2 + \frac{\omega_z}{Q_z}S + \omega_z^2\right)}{\left(S^2 + \frac{\omega_{p1}}{Q_{p1}}S + \omega_{p1}^2\right)\left(S^2 + \frac{\omega_{p2}}{Q_{p2}}S + \omega_{p2}^2\right)}$$

$$Z_{21}(S) = \frac{kL\omega_{p1}^2\omega_{p2}^2 \times S}{\left(S^2 + \frac{\omega_{p1}}{Q_{p1}}S + \omega_{p1}^2\right)\left(S^2 + \frac{\omega_{p2}}{Q_{p2}}S + \omega_{p2}^2\right)}$$

where $$\omega_{p1,p2} = \frac{\omega_0}{\sqrt{1 \pm k}},\ \omega_z = \frac{\omega_0}{\sqrt{1-k}},\ \omega_0 = \frac{1}{\sqrt{LC}}$$

and $$Q_{p1,p2} = Q\sqrt{1 \pm k},\ Q_Z = Q\frac{\sqrt{1-k^2}}{1+k^2},\ Q = \frac{\omega_0 L}{R_S}$$

In the context of dual-band design, $Z_{11}$ and $Z_{21}$-based loads have the following advantages and disadvantages. (1) In $Z_{21}$-based design the drive port and the load port are isolated. Hence, the parasitic capacitance of the drive and load ports can be separately absorbed in the two sides of the coupled resonator. Therefore, $Z_{21}$-based design can support higher parasitic capacitance while using an identical transformer to achieve similar peak gain; (2) The $Z_{21}$-based design with two transformer feed points at opposite sides of the transformer coil can be adopted to realize a long and skinny layout for each stage. On the other hand, in a $Z_{11}$-based design, as the driver and the load are both connected to the same port of the transformer, $Z_{11}$ loads can be adopted in a scenario where signal path takes a 90° turn (see driver stage #3 in FIG. 4); (3) In contrast to a $Z_{21}$-based design where the high-frequency resonance mode (at $\omega_H$) always has worse gain than the low frequency mode (at $\omega_L$), $Z_{11}$-based design with asymmetric resonator can achieve higher gain either at $\omega_H$ or at $\omega_L$. For an asymmetric resonator with desired dual-band operation at $\omega_H$ and at $\omega_L$, resonator's design parameters $\omega_1(=1/\sqrt{L_1C_1})$ and $\omega_2(=1/\sqrt{L_2C_2})$ can be chosen according to the following equations, where k should be less than or equal to $(\omega_H^2-\omega_L^2)/(\omega_H^2+\omega_L^2)$.

$$\omega_1^2 = \frac{1}{L_1C_1} = \frac{(1-k^2)}{2}\left[\omega_H^2 + \omega_L^2 \mp \sqrt{(\omega_H^2+\omega_L^2)^2 - \frac{4\omega_H^2\omega_L^2}{(1-k^2)}}\right]$$

$$\omega_2^2 = \frac{1}{L_2C_2} = \frac{(1-k^2)}{2}\left[(\omega_H^2+\omega_L^2) \pm \sqrt{(\omega_H^2+\omega_L^2)^2 - \frac{4\omega_H^2\omega_L^2}{(1-k^2)}}\right]$$

Figure 10:
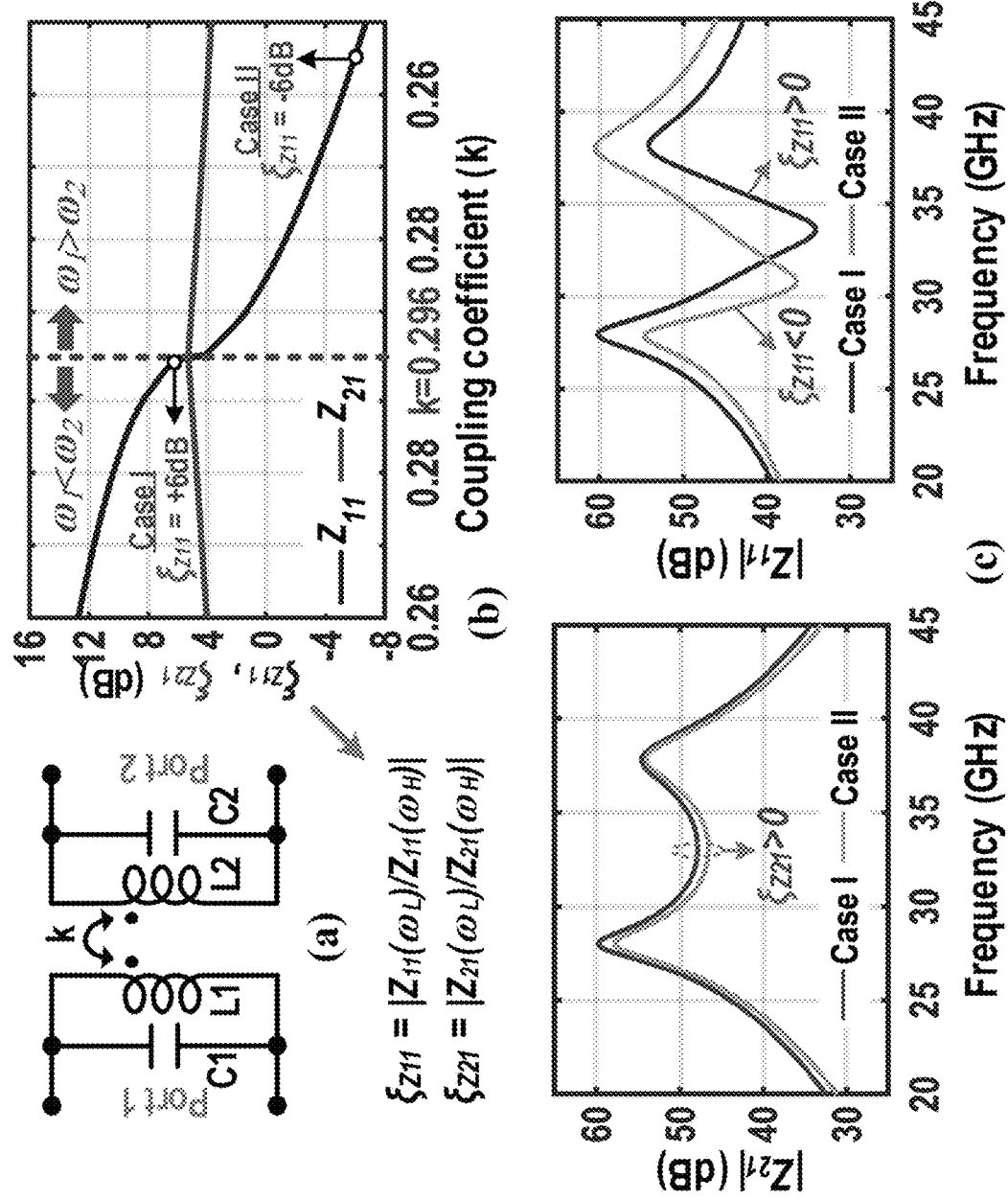
FIG. 10, view (a) is a circuit diagram of a coupled resonator load. View (b) is a graph showing the ratio of the peak amplitudes in a dual-band $Z_{11}$ and $Z_{21}$-based coupled resonator load. View (c) is a graph showing the $Z_{11}$ and $Z_{21}$ frequency response for two operating regions.

Note that $\omega_1$ and $\omega_2$ have two solutions—one for $\omega_1 > \omega_2$ and other for $\omega_1 < \omega_2$ (shown in View (b) of FIG. 10 in the two sides of the dotted line). To find the design space for achieving higher or lower amplitudes at $\omega_H$ or $\omega_L$, the $Z_{11}$ and $Z_{21}$ amplitude responses are simulated for an asymmetric resonator with $L_1=L_2=200$ ph and $Q_1=Q_2=20$. The ratio of two peak amplitudes at $\omega_L$ and $\omega_H$ is plotted versus k in View (b) of FIG. 10 in dB scale for $f_L=28$ GHz and $f_H=38$ GHz. It can be seen that the amplitude ratio in case of $Z_{21}$ is always greater than 0 dB, where in case of $Z_{11}$ it can be either greater or less than 0 dB. Two exemplary amplitude responses for two operating regions of $Z_{11}$ are shown in View (c) of FIG. 10. Therefore, it can be concluded that $Z_{11}$-based design can help equalizing the gain at high- and low-frequency bands in a dual-band design. The aforementioned property is utilized in the PA design to reduce the gain difference in the two operating bands by incorporating one $Z_{11}$-based driver with other $Z_{21}$-based gain stages.

Figure 11:
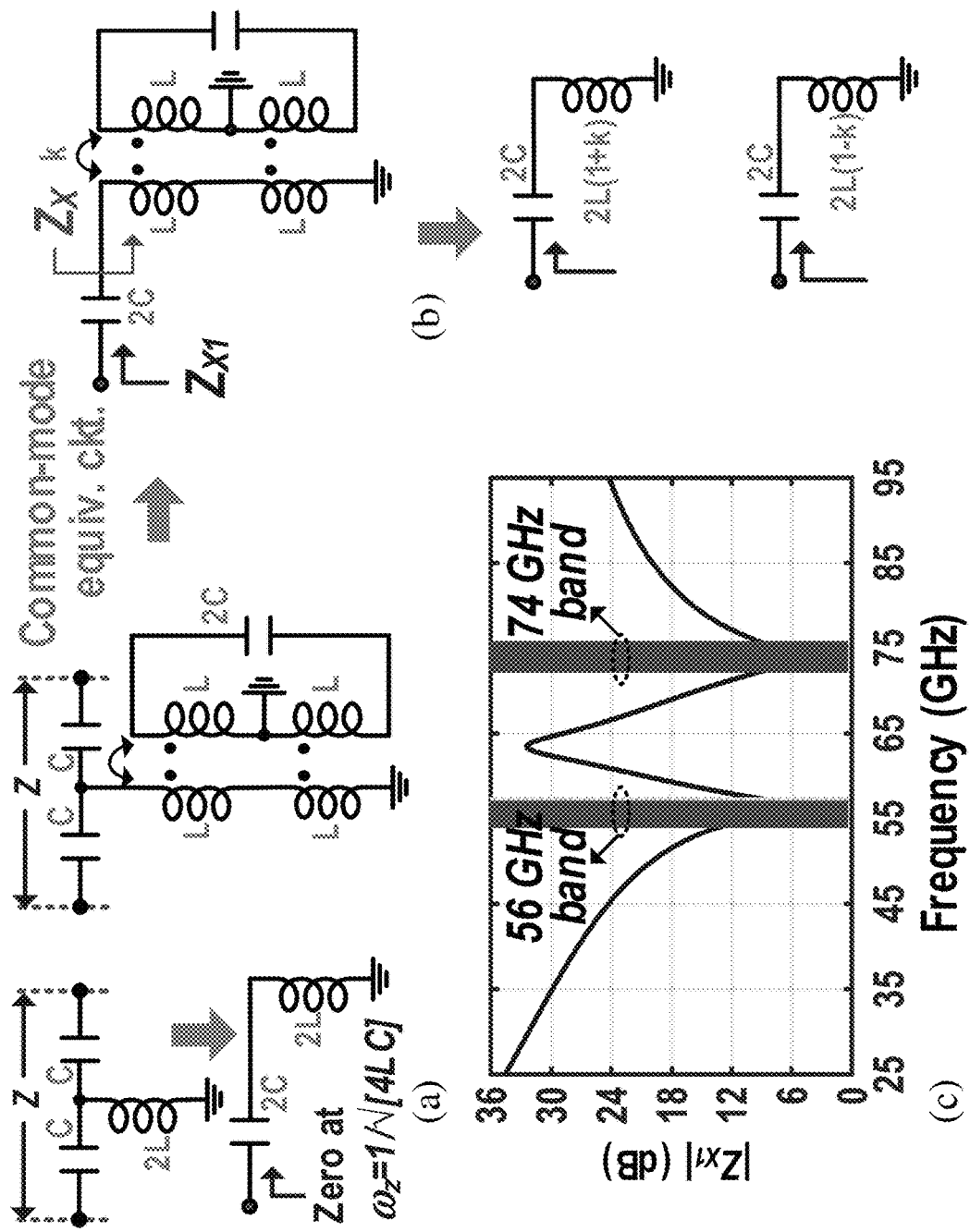
FIG. 11, view (a) circuit diagram for a single band second harmonic trap. View (b) is a circuit diagram for a dual-band second harmonic trap network used in the design shown in FIG. 4. View (c) is a graph showing a simulated door-Ben second harmonic short response.

Dual-Band Second Harmonic Short: PA output stage biased in deep class-AB or in class-B generates significant second harmonic currents under large-signal condition. The second harmonic current when flows through the load impedance creates significant second harmonic voltage at the output node that can degrade $P_{sat}$, PAE and AM-PM distortion of the PA show that the performance degradation can be overcome by placing harmonic traps (load network that provides the harmonic current a low impedance path to ground) at the PA output node. However, previous techniques employ a single frequency second-harmonic trap. These techniques are difficult to incorporate in wideband or multiband designs. A conventional harmonic trap design is shown in View (a) of FIG. 11. To support 28 and 37 GHz operation, significant amount of frequency tuning is required, thereby degrading quality factor of the trap across frequency. Moreover, conventional harmonic-trap networks cannot support concurrent dual-band second harmonic trapping.

A novel second-harmonic trap network is introduced next. It utilizes a transformer-coupled resonator to realize a dual-band short, as shown in View (b) of FIG. 11. In a differential PA design, second harmonic current appears as common mode signal. The common-mode equivalent network of the proposed design is shown in View (B) of FIG. 11, where the common-mode input impedance ($Z_{X1}$) of the network can be calculated as follows.

$$Z_{X1}(S) = 2L(1-k^2) \times \frac{\left(S^2 + \frac{\omega_{Z1}}{Q_{Z1}}S + \omega_{Z1}^2\right)\left(S^2 + \frac{\omega_{Z2}}{Q_{Z2}}S + \omega_{Z2}^2\right)}{S\left(S^2 + \frac{\omega_0}{Q_0}S + \omega_{01}^2\right)}$$

where $$\omega_{z1} = \frac{1}{\sqrt{4(1+k)LC}},\ \omega_{z2} = \frac{1}{\sqrt{4(1-k)LC}}$$

and $$Q_{z1,z2} = Q_0\sqrt{(1 \pm k)},\ Q_0 = \omega_0 L/R,\ \omega_0 = 1/\sqrt{4LC}$$

The equation above reveals that $Z_{X1}$ has two zeroes that concurrently provide low-impedance paths at two frequencies. The proposed network is equivalent to a series LC network where the inductance ($Z_X$ in View (b) of FIG. 11) concurrently takes two different values at two resonant modes of the transformer (even and odd mode). A simulated dual-band second-harmonic trap response is shown in View (c) of FIG. 11 for a dual-band 56/74 GHz short. The second harmonic short reduces the second-harmonic current in the PA's output stage by ~3×.

Bidirectional Self-Neutralized Phase-Invariant PGA

Unlike conventional phased-array transceivers where separate PGAs have been used in the TX and RX paths, all PGAs in this prototype are designed to share passives in TX and RX configuration for compactness. Compact designs not only reduce area and cost, but also eliminate losses due to long interconnects. A straightforward way to realize a bidirectional PGA is by using a single programmable transconductor in conjunction with signal-path switches to reverse the direction of signal flow. However, in such a design, the signal-path switches can cause significant loss at mm-wave frequency while also degrading PGA linearity.

Figure 12:
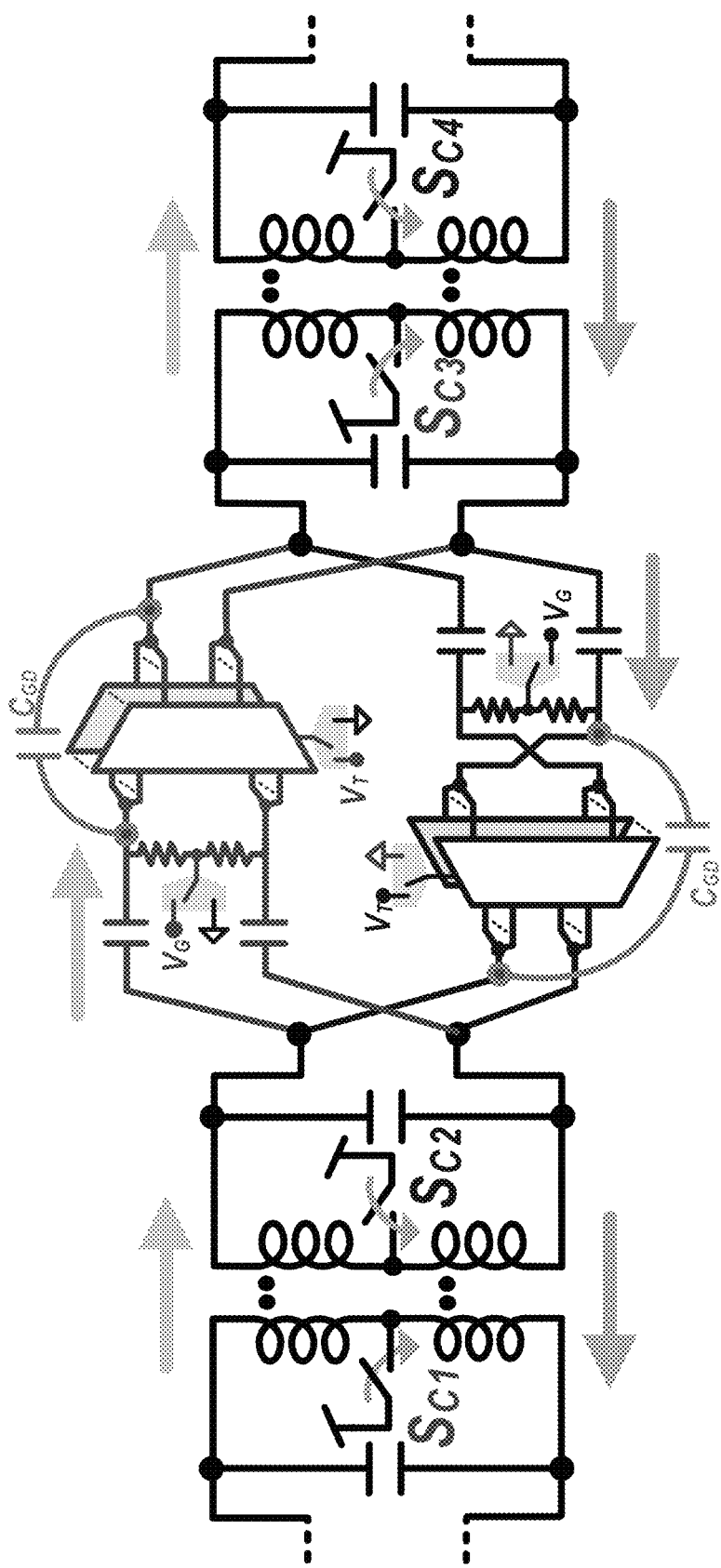
FIG. 12 is a schematic circuit diagram showing a bidirectional programmable gain stage. A forward path is shown in red in a backward path is shown in blue. The feedback path from both the output ports to one of the input ports is shown in green.

Bidirectional PGA Design: To overcome the aforementioned problem, a bi-directional PGA design is introduced that avoids signal-path switches, as shown in FIG. 12. Here, two back-to-back programmable transconductors are used, one for each signal path direction. To configure for forward (reverse) signal flow, the forward (reverse) programmable transconductor is turned ON, while the reverse (forward) transconductor is turned OFF. In addition to turning ON/OFF the transconductor cells by controlling the tail-bias of the differential pair, separate biasing network for the transconductors' gate-bias is also used to enable either the forward or the backward path. Although the proposed technique uses twice the number of active devices and increases the capacitance at each node by the OFF-state capacitance of each path, it eliminates signal-path switch loss.

Neutralization Technique: A differential amplifier without cascode devices experiences output-to-input feedback through the gate-to-drain capacitance ($C_{GD}$) of the input pair. An explicit cross-coupled capacitance pair can be used to neutralize this feedback, thereby improving differential-mode stability. Neutralization based on this principle is implicitly available in the proposed bi-directional PGA topology, because the $C_{GD}$ of the OFF-state transconductor in the reverse/forward path cancels the feedback through the ON-state transconductor in the forward/reverse path (see FIG. 12). Transconductors in the forward and reverse paths should be oppositely connected, as shown in FIG. 12 (the feedback path from one output to both the input nodes are highlighted in green). It is important to note that feedback capacitances from ON and OFF paths in the self-neutralized bidirectional architecture matches well over PVT, thereby providing PVT-invariant differential-mode stability.

Figure 13:
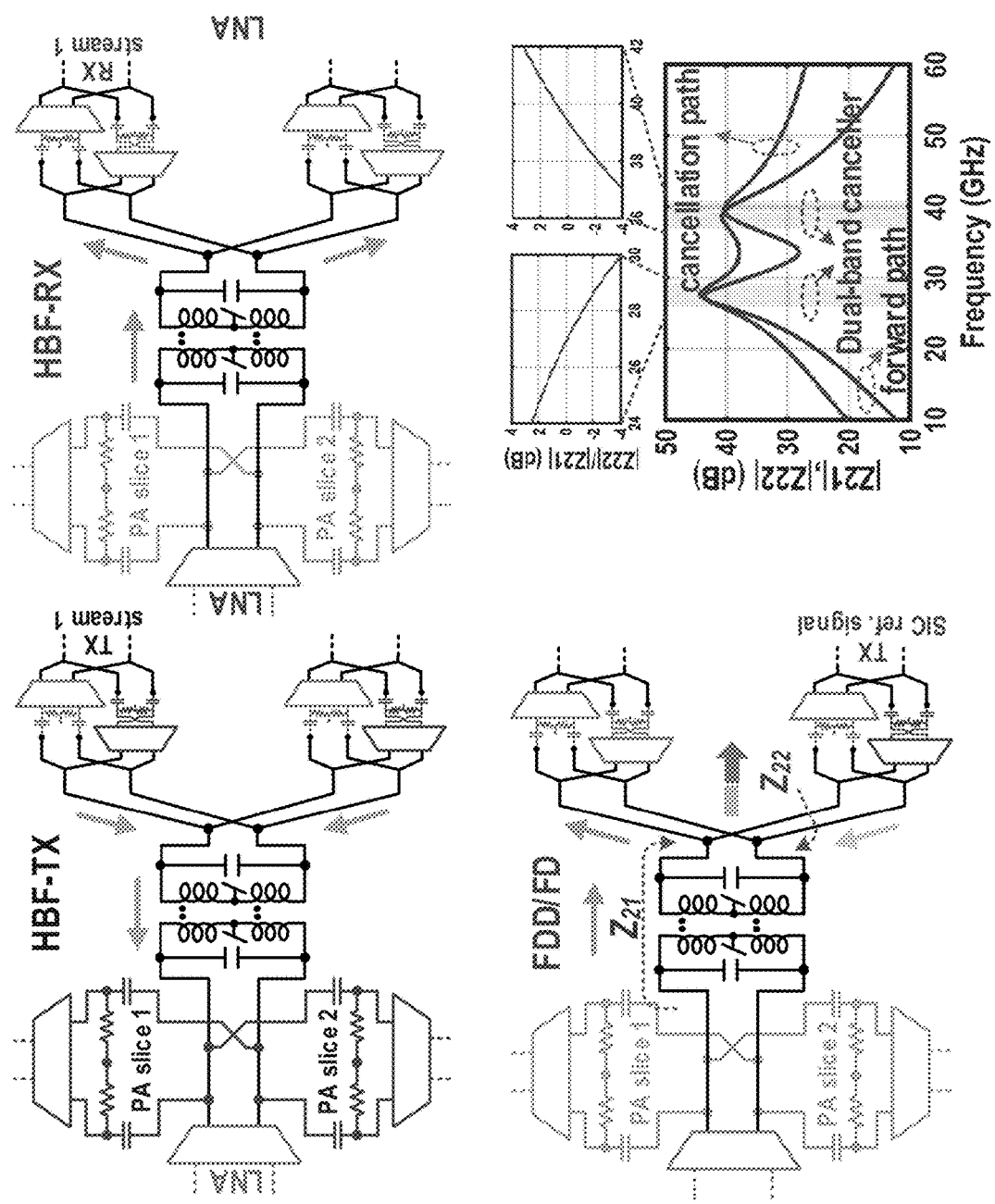
FIG. 13 shows an LNA/PA and stream #1/#2 interface splitter combiner network in two-stream FC/HBF TX mode in view (a), in two-stream FC/HBF's RX mode in view (b) and in FDD or full-duplex beamforming mode with SIC in view (c). View (d) is a graph showing the magnitude response of the coupled-resonator load in the forward signal path ($Z_{21}$) and in the cancellation path ($Z_{22}$) showing the capability of door-band SIC.

Common-mode stability of the proposed bi-directional PGA topology is improved by using switches $S_{C1}$-$S_{C4}$ at the center taps of the coupled resonators that selectively connects to the power supply or leave it open to reduce common mode feedthrough. As shown in FIG. 13, switches $S_{C1}$ and $S_{C3}$ ($S_{C2}$ and $S_{C4}$) are turned ON for the forward (reverse) configuration.

Bidirectional Per-Stream Complex-Weighting

The design of the per-stream, bi-directional complex weights is described with reference to FIG. 4. A pair of bidirectional 5-bit (including sign bit) PGAs is used in each stream to realize Cartesian complex weights. In the TX path, inputs to the PGA pair can be generated locally by using quadrature hybrids (one per stream) or can be generated globally before splitting to other elements by extending the Cartesian combining technique. The outputs of the PGA's in the complex weight are combined in the TX path using a bidirectional current-mode-combiner. Similarly, in the RX path, the inputs of the PGA's in the complex weight are generated using a voltage-mode-splitter, and the outputs from the PGA pair can be combined either locally or globally. Additionally, fine gain control (~0.3 dB LSB) in each stream is achieved by using an additional 5-bit (without sign) bi-directional PGA, and fine phase control (~0.5°) is achieved by using a 5-bit digitally switchable capacitor in the coupled resonator load of the PGA, as shown in FIG. 4. Fine gain and phase control enable accurate complex-weighting and accurate SIC in the STAR mode. Finally, to improve common mode stability, switches $S_5$-$S_8$ in FIG. 4 is incorporated in two streams.

Splitter/Combiner and Dual-Band SIC

Both the bi-directional streams are interfaced with the PA and the LNA using a single coupled resonator. One side (e.g., the primary side) of the coupled resonator is connected to two PA slices and the LNA, and the secondary side is connected to both streams (see FIG. 3a). Views (a-c) of FIG. 13 show how the interface can be configured in TX, RX and STAR modes without signal path switches. In the TX mode, LNA is turned OFF and both streams are configured to transmit, as shown in View (a) of FIG. 13. Signal currents from the two PGAs from the two streams are combined in the secondary side of the coupled resonator. The voltage developed in the primary side splits to two PA slices via the voltage-mode splitter. In the RX mode, both PA slices are turned OFF and both streams are configured to receive, as shown in View (b) of FIG. 13. The signal current from LNA stage #2 transconductor is fed into the primary side of the coupled resonator. The voltage developed on the secondary side is split into two streams by the voltage-mode splitter by reusing the same passive structure that is used for current combining in the TX mode.

In the STAR mode of operation, per-element SIC is required in the RX beamformer. In this mode, both PA slices are turned OFF. One stream is configured as receive for the desired input, and the other stream is configured as transmit to perform SIC, as shown in View (c) of FIG. 13. The signal current from LNA's stage #2 transconductor is inserted in the primary side of the coupled resonator, and the signal current from the SIC path stream is fed into the secondary side. After SIC is performed inside the coupled-resonator, the voltage developed in the secondary side drives the receive stream. Therefore, in STAR mode, the forward path sees the trans-impedance $Z_{21}$ of the resonator as the load, while the SIC path sees the driving port impedance ($Z_{22}$) as the load (see View (c) of FIG. 13). As described above, both the driving port impedance and the transimpedance of a coupled resonator have dual-band behavior. The following equation shows how the gain through both the paths can be equalized in both bands by selecting moderate coupling and high kQ product. This is supported by the simulation shown in View (d) of FIG. 13.

$$\left|\frac{Z_{11}(j\omega)}{Z_{21}(j\omega)}\right|_{\omega_{p1,p2}} \approx \left|\frac{\omega_z^2 - \omega^2 + j\frac{\omega_z}{Q_z}\omega}{k\omega_{p1}^2 \omega_{p2}^2 / \omega_0^2}\right|_{\omega_{p1,p2}} = \sqrt{1 + \left(\frac{1}{kQ} \times \frac{1+k^2}{\sqrt{1 \pm k}}\right)^2} \approx 1$$

Thus, both the receive path and the SIC path can achieve reasonable gain concurrently in both bands, thereby enabling cancellation in either of the two bands. The forward and the cancellation path can be at two different frequencies (in FDD mode) or can be in the same frequency band (in FD mode). It should be noted that the noise from SIC path can degrade the RX NF in FDD/FD configuration. However, since the SIC is performed after two LNA stages in the RX chain, NF degradation is minimal (0.4/0.5 dB in 28/37 GHz band in simulation) in this design.

A new multi-antenna simultaneous transmit-receive system architecture has been introduced herein that provides a way to cancel self-interference in the RF-domain on a per-element basis in an FC-HBF or DBF transceiver. Additionally, a compact circuit topology is introduced that realizes dual-band bi-directional operation while introducing minimal loss from the TX-RX switching networks. Numerous innovative circuit techniques are disclosed herein that includes dual-band antenna interface, dual-band second harmonic shorting network, dual-band gain equalization and bi-directional self-neutralized PGA. The front-end design can be incorporated directly in a digital or hybrid beamforming transceiver system. The front-end achieves state-of-the-art performance when benchmarked against recent 28 GHz beamformers, multi-band mm-wave PAs, and single antenna STAR system with RF-domain SIC.

The embodiments have been explained in terms of specific designs. However, as would be realized by one of skill in the art, variations of the exemplary designs which are still within the scope of the invention as defined by the following claims are possible.

We claim:

1. A bi-directional, transmit/receive module suitable for use as a front-end interface between radio electronics and an antenna array in a beamforming transceiver, comprising:
    a shared antenna interface network;
    a transmit path power amplifier coupled to the shared antenna interface network;
    a receive path low noise amplifier coupled to the shared antenna interface network;
    a splitter/combiner circuit coupled to transmit and receive paths;
    a bi-directional complex-valued weighting circuit for each multiple-input-multiple-output stream, coupled to the splitter/combiner circuit; and
    self-interference cancelling circuitry for:
        controlling amplitude and phase of a transmitted signal to produce a cancellation signal; and
        injecting the cancellation signal into the receive path prior to the splitter/combiner.

2. The transmit/receive module of claim 1 further comprising, for each multiple-input-multiple-output stream:
    a fine gain control; and
    a fine phase control.

3. The transmit/receive module of claim 1, the shared antenna interface network acting as a two-way transformer power combiner when operated in transmit mode and as a matching network to a low noise amplifier in receive mode.

4. The transmit/receive module of claim 3, the antenna interface network having a high-power transmit mode in which dual power amplifier slices are used and a low power mode in which a single power amplifier slice is used.

5. The transmit/receive module of claim 3 wherein the power amplifier slices are turned on or off using switches.

6. The transmit/receive module of claim 3 wherein both power slices are turned off when the transmit/receive module is in receive mode.

7. The transmit/receive module of claim 4, each power amplifier slice comprising one or more driver stages to drive the splitter/combiner circuit.

8. The transmit/receive module of claim 5, each output stage comprising a dual-band 2nd harmonic shorting network.

9. The transmit/receive module of claim 1 wherein the received signal and the cancellation signal have similar frequency responses at the resonant frequencies at bands of interest.

10. The transmit/receive module of claim 1 in which the transmit/receive module is operated either in transmit or receive mode, and further wherein other transmit/receive modules in accordance with claim 1 are operated in either transmit or receive mode simultaneously.

11. The transmit/receive module of claim 10 wherein each antenna element in the antenna array is shared between the transmit and receive paths.

12. The transmit/receive module of claim 10 wherein the transmit and receive paths use separate antenna arrays.

13. The transmit/receive module of claim 12 wherein a radio frequency domain cancellation signal is generated for each element in the receive antenna array.

14. The transmit/receive module of claim 12 wherein each radio frequency domain cancellation signal is generated using a separate upconverter and a digital-to-analog converter.

15. The transmit/receive module of claim 13 wherein any residual interference is cancelled in digital domain in the receive array.

16. A bi-directional fully-connected hybrid beamforming transceiver for simultaneously transmitting a transmit signal and receiving a receive signal comprising:
    a transmit/receive module of claim 1 configured for transmitting; and
    a transmit/receive module of claim 1 configured for receiving;
    wherein self-interference having a large group delay is cancelled by directing a spatial-null towards reflection paths in both the transmitting transmit/receive module and the receiving transmit/receive module.

17. The bi-directional fully-connected hybrid beamforming transceiver of claim 16 wherein the transmit/receive module configured for receiving uses the receive path to receive and the transmit path to upconvert a copy of a baseband transmit signal, wherein the upconverted copy of the baseband transmit signal is independently complex weighted to cancel an incoming transmit signal in each receive antenna element.

* * * * *